J. M. PETERMAN.
SLIDING GATE.
APPLICATION FILED AUG. 19, 1909.
942,408.
Patented Dec. 7, 1909.
2 SHEETS—SHEET 1.
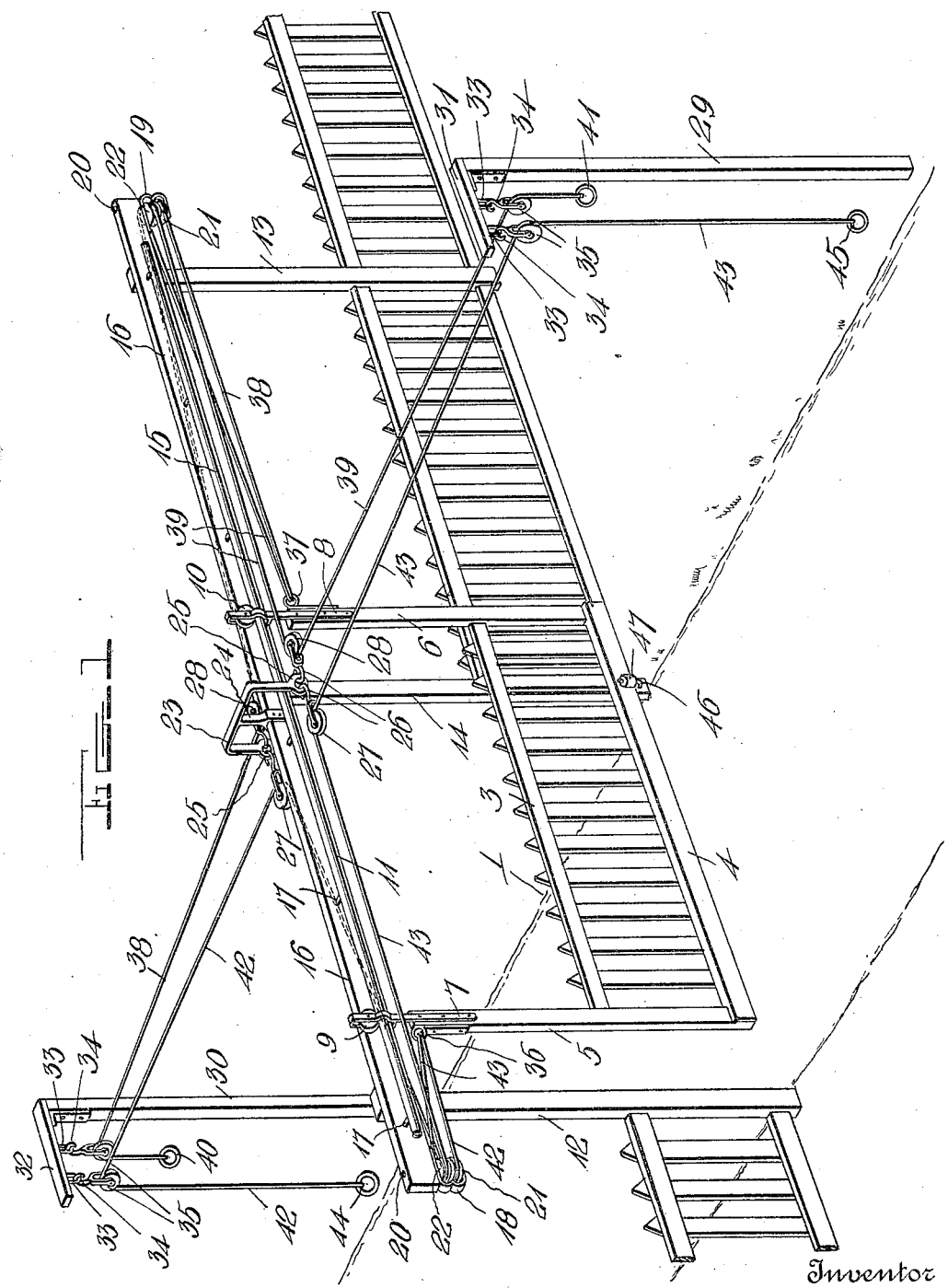
Witnesses
Inventor
Jacob M. Peterman
by H. B. Willson & Co.
Attorneys

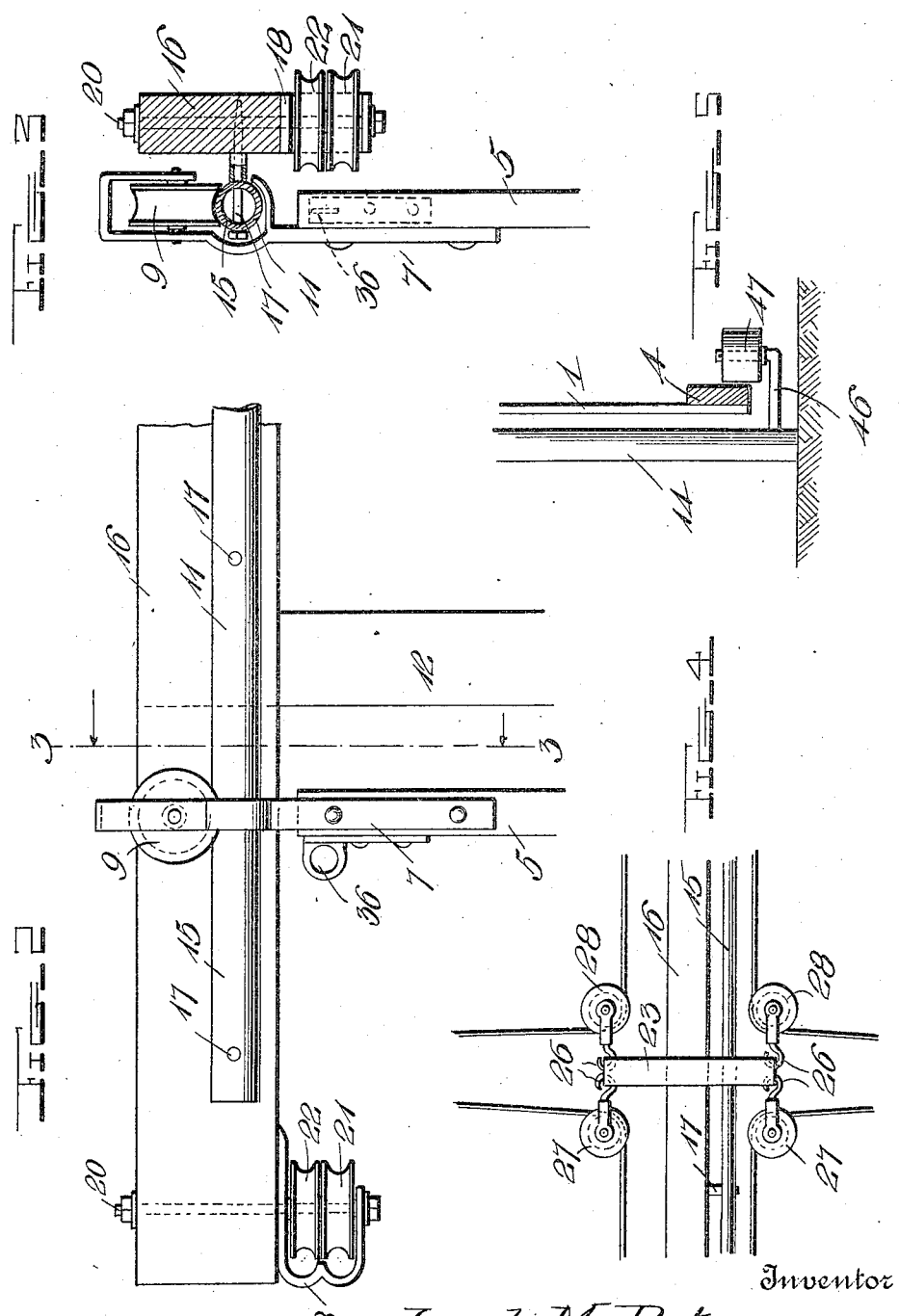

UNITED STATES PATENT OFFICE.

JACOB M. PETERMAN, OF NEW MARKET, IOWA.

SLIDING GATE.

942,408.  Specification of Letters Patent.  Patented Dec. 7, 1909.

Application filed August 19, 1909.  Serial No. 513,678.

*To all whom it may concern:*

Be it known that I, JACOB M. PETERMAN, a citizen of the United States, residing at New Market, in the county of Taylor and State of Iowa, have invented certain new and useful Improvements in Sliding Gates; and I do declare the following to be a full, clear, and exact description of the invention, such as will enable others skilled in the art to which it appertains to make and use the same.

This invention relates to an improved sliding gate and is designed for use in connection with overhead operating ropes by means of which the gate may be manipulated from a carriage or by a horseman from a position within the carriage or upon the horse.

The object of the invention is to provide a simply constructed and efficient gate of this character which may be readily opened and closed.

With the foregoing and other objects in view, the invention consists of certain novel features of construction, combination and arrangement of parts, as will be more fully described and particularly pointed out in the appended claim.

In the accompanying drawings, Figure 1 is a perspective view of this improved gate, with the gate partly open; Fig. 2 is a detail side elevation; Fig. 3 is a vertical section taken on the line 3—3 of Fig. 2; Fig. 4 is a detail fragmentary plan view, showing the mounting of the pulleys; Fig. 5 is a detail fragmentary sectional view showing the means for guiding the lower part of the sliding gate.

In the embodiment illustrated, a gate 1 is shown, preferably composed of upright slats or palings, as 2, connected at their opposite ends to cross bars 3 and 4. The opposite ends of said cross bars 3 and 4 are connected to posts 5 and 6 which extend some distance above the top cross bar 3 and are provided with hangers 7 and 8 in which pulleys 9 and 10 are mounted, said pulleys being adapted to travel on a supporting track 11 arranged above the gate and supported at its opposite ends on posts 12 and 13 and by an intermediate post 14, as is clearly shown in Fig. 1. This track 11 is preferably composed of a tubular member 15 mounted at one side of a bar 16, being spaced therefrom by any suitable means, preferably by laterally extending arms, as 17.

Arranged at opposite ends of the bar 16, preferably on the lower face thereof, are two pulley supports 18 and 19 being preferably made substantially U-shaped and the free ends of the arms thereof are connected to the bar 16 by means of bolts, as 20, said bolts forming spindles for the pulleys. Mounted within each supporting bracket 18 and 19 are two superposed grooved pulleys 21 and 22, over which the operating ropes are designed to pass and tangling thereof prevented, as will be hereinafter described.

Mounted above the post 14 on the bar 16 is an approximately U-shaped hanger or bracket 23 having an arm 24 depending from the center of its inner face and bifurcated at its free end to straddle the bar 16 to which it is connected by any suitable means. The free ends of the legs of the member 23 are provided with eyes, as 25, for the reception of hooks, as 26, connected to guiding pulleys, as 27, and 28, arranged on opposite sides of the track supporting bar 16 and over which the guiding or operating ropes hereinafter to be described are designed to pass.

Posts 29 and 30 are arranged at one side of the roadway a suitable distance from the gate on either side of the fence, to provide for the opening of the gate by persons within a vehicle. These posts 29 and 30 are provided at their upper ends with laterally extending arms 31 and 32 which extend inwardly toward the roadway and are provided on their lower faces with longitudinally spaced supporting staples or loops, as 33, to receive the supporting hooks, as 34, of guide pulleys, as 35, over which the free ends of the operating ropes are designed to pass and be held in position thereby, ready for grasping by the operator.

Two eyes 36 and 37 are secured to the upper ends of the gate posts 5 and 6 at their outer edges to which the operating ropes, now to be described, are connected. Two ropes 38 and 39 are secured at one end to the eye 37 on the rear post 6 of the gate. The rope 38 is passed around the lower pulley 21 mounted in the bracket 19 and then passes to the pulley 28 at the opposite side of the bar 16 and then extends forward and passes over the inner pulley 35 mounted on the arm 32 of the post 30 and the free end of said rope is provided with a grip member, here shown in the form of a ring 40 which hangs normally in position to be grasped by the operator for manipulating the gate. One end of the rope 39 is also secured to the eye 37 on the post 6 and extends around the upper pulley 22 in the bracket 19 in the direction opposite to the rope 38. This rope 39 is then extended on the same side of the bar 16 and passes around the pulley 28 and is then passed over the pulley 35 on the same side of the gate and is provided at its free end with a handle or grip member, here shown in the form of a ring 41. These ropes 38 and 39 are designed for opening the gate from either side thereof and a pull downward on either rope will impart a rearwardly sliding motion to the gate 1, causing it to slide on the track 11 into open position said ropes passing each other in different planes being vertically spaced by the arrangement of the pulleys 21 and 22. Another pair of ropes 42 and 43 designed for closing the gate is secured at one end to the eye 36 arranged on the front post 5 of the gate. The rope 42 which is secured at one end to the eye 36 is passed around the lower pulley 21 in the bracket 18 mounted on one end of the bar 16 and then passes around the pulley 27 supported by the U-shaped bracket 23 at the other side of the bar 16 and then extends at right angles to said bar 16 and passes over the outer pulley 35 mounted on the arm 32 of the post 30 and is provided at its free end with a grip member, here shown in the form of a ring 44. A downward pull exerted on this ring 44 tends to move the gate forwardly on the track 11 into closed position. The other rope 43 which is secured to the eye 36 extends around the upper pulley 22 in the bracket 18 in a direction opposite to the rope 42 and then extends parallel with the bar 16 on the same side thereof and passes around the pulley 27 supported by the U-shaped member 23 and then extends at right angles to the bar 16 and then extends over the pulley 35 mounted on the arm 31 of the post 29 and is provided at its free end with a grip in the form of a ring 45.

An L-shaped arm or keeper 46 is secured to the lower end of the intermediate post 14 and the short arm thereof extends upwardly and is spaced a suitable distance from said post and is provided with a guide roller 47 between which and the post 14, the lower cross bar 4 of the gate is designed to pass, said roller serving to guide the gate and hold it against lateral movement.

It will thus be obvious that a downward pull exerted on either of the ropes 38 or 39 will cause the gate to move rearwardly into an open position, while a similar pull on either rope 42 or 43 will move the gate forward into a closed position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

A gate supporting structure comprising a cross bar, means for supporting said cross bar, a U-shaped member having a central depending bifurcated arm secured to said bar, with the legs thereof arranged on opposite sides of the bar, eyes arranged in the free ends of said legs, guide pulleys supported in said eyes on opposite sides of said bar, a pair of guide pulleys arranged at each end of said bar on the lower face thereof and flexible elements operable on said pulleys and adapted to be connected with the gate to be actuated.

In testimony whereof I have hereunto set my hand in presence of two subscribing witnesses.

JACOB M. PETERMAN.

Witnesses:
E. C. NORDYKE,
S. H. COLEMAN.